United States Patent [19]
Cunningham et al.

[11] 3,715,449
[45] Feb. 6, 1973

[54] FLUID FILLED HIGH VOLTAGE CABLE TERMINAL APPARATUS

[75] Inventors: Francis V. Cunningham, Western Springs; Cyril V. Miller, Arlington Heights, both of Ill.

[73] Assignee: Joslyn Mfg., and Supply Co., Chicago, Ill.

[22] Filed: April 1, 1971

[21] Appl. No.: 130,425

Related U.S. Application Data

[63] Continuation of Ser. No. 790,815, Jan. 13, 1969, abandoned.

[52] U.S. Cl.................174/11 BH, 174/19, 174/73 R
[51] Int. Cl.............................................H02g 15/22
[58] Field of Search.174/11 BH, 12 BH, 19, 20, 73R, 174/74 R, 75 R, 75 D, 75 F, 80

[56] References Cited

UNITED STATES PATENTS

| | | | |
|---|---|---|---|
| 2,727,938 | 12/1955 | Nicholas | 174/19 |
| 3,517,113 | 6/1970 | Ono et al. | 174/19 X |
| 3,290,428 | 12/1966 | Yonkers | 174/73 R |
| 3,404,211 | 10/1968 | Nicholson | 174/73 R X |
| 3,471,628 | 10/1969 | Harmon | 174/19 X |

FOREIGN PATENTS OR APPLICATIONS

| | | | |
|---|---|---|---|
| 200,453 | 12/1965 | Sweden | 174/19 |

*Primary Examiner*—Laramie E. Askin
*Attorney*—Mason, Kolehmainen, Rathburn & Wyss

[57] ABSTRACT

A terminal apparatus for use with insulated power cable comprising a rigid housing having an elongated bore for receiving a terminal end portion of the cable, and an elastomeric sealing means at one end of the bore. The sealing means extends into the bore from said one end towards the opposite end for a distance substantially less than the length of the bore, and the remaining portion of the bore is filled with dielectric insulating fluid and a load bearing insulation system that maintains the sealing means in air-free sealing engagement between the bore and the cable regardless of service temperature variations.

10 Claims, 2 Drawing Figures

PATENTED FEB 6 1973
3,715,449
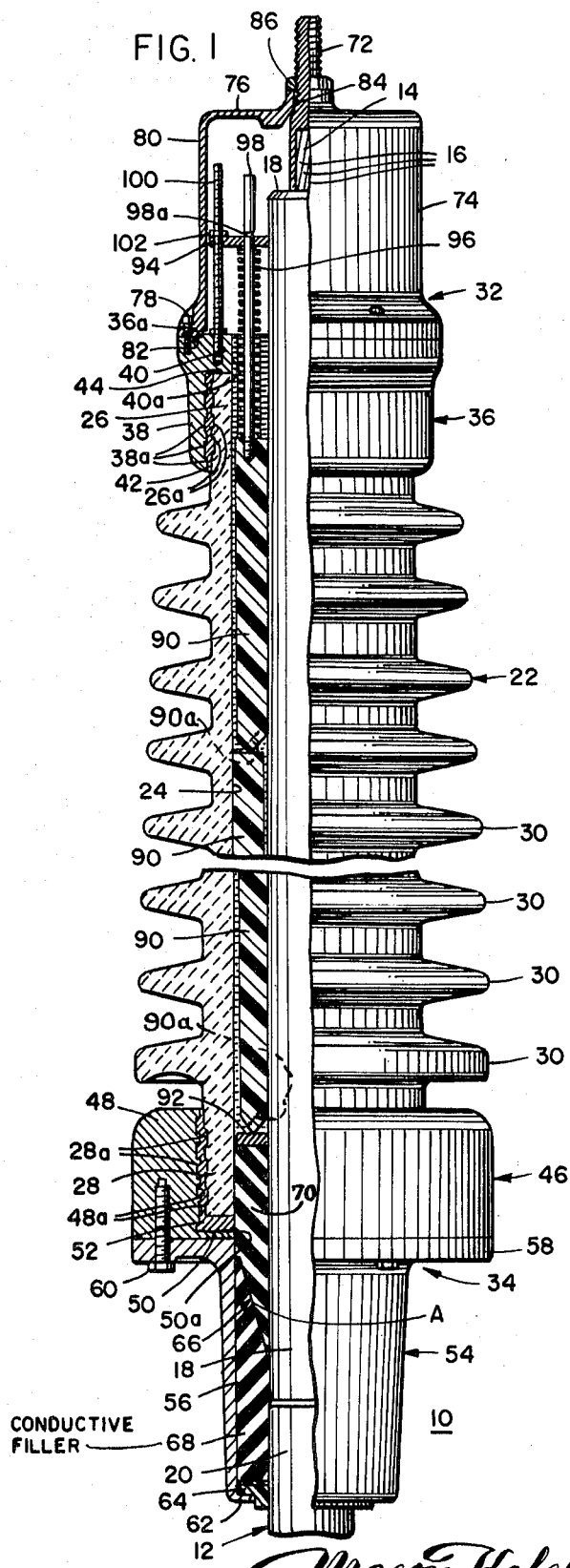
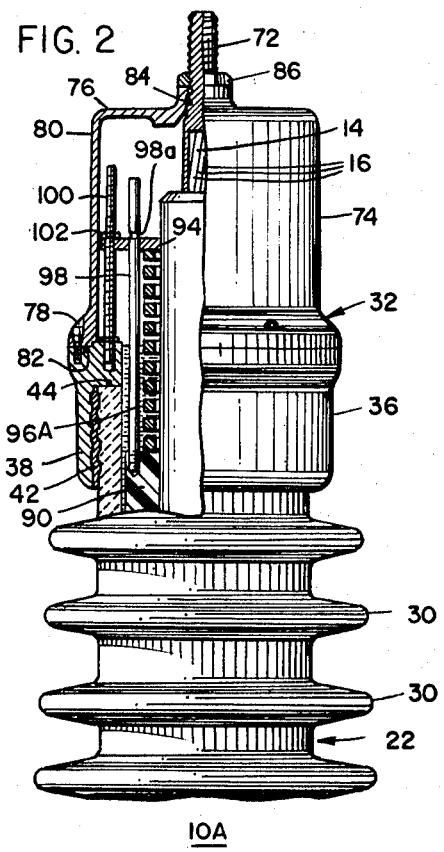
INVENTORS:
FRANCIS V. CUNNINGHAM
CYRIL V. MILLER
BY
Mason, Kolehmainen, Rathburn & Wyss
ATT'YS

FLUID FILLED HIGH VOLTAGE CABLE TERMINAL APPARATUS

The present application is a continuation of application Ser. No. 790,815 filed Jan. 13, 1969, and now abandoned.

The present invention relates to a new and improved electrical terminal apparatus, and more particularly to a terminal apparatus suitable for use with high voltage insulated power cable.

The present invention is an improvement on the cable connector shown in U.S. Pat. No. 3,290,428 assigned to the same assignee as the present invention. The aforementioned Yonkers patent employs an elongated, tubular dielectric filler mounted on the terminal end portion of the cable insulation, and the filler is slightly tapered so that when it is forced into an elongated cavity formed in the terminal housing, air is progressively excluded from between the adjacent confronting surfaces of the cable insulation, the filler, and the housing wall. As higher and higher voltages are used, longer and longer dielectric fillers are required and the problem of progressively expelling air from between the surfaces of the filler, cable insulation and housing becomes increasingly difficult. When air pockets remain between the confronting surfaces of the filler, cable, and housing, damaging corona discharges can develop.

The present invention is adapted to eliminate the above problem and provides a high voltage terminal apparatus having an air-free dielectric and does not require the use of a relatively long dielectric elastic filler made to precise dimensions.

It is an object of the present invention to provide a new and improved terminal apparatus for high voltage power cable, which apparatus uses a relatively short, elastomeric filler rather than a long filler as previously required for similar voltage ranges.

It is another object of the present invention to provide a new and improved electrical terminal apparatus for use with high voltage power cable which apparatus can be installed by relatively unskilled workmen with excellent results.

Another object of the present invention is to provide a new and improved electrical terminal apparatus of the type described which employs an elastomeric, dielectric sealing member having a length substantially less than the total length of insulation needed for the voltage being used.

Another object of the invention is to provide a high voltage terminal apparatus as described employing one or more thrust bearing, insulating members for maintaining the elastomeric sealing means in air-free sealing engagement between the housing bore and cable regardless of temperature variation.

Another object of the present invention is to provide a new and improved electrical apparatus of the character described which does not require close dimensional tolerances to be maintained in the housing bore or on the power cable member, yet still providing air-free dielectric interfaces in a terminal insulator for a high voltage application.

Another object of the present invention is to provide a new and improved electrical terminal apparatus of the character described which may be easily and rapidly installed with no chance that the installation will be subject to corona discharge at service voltages.

Another object of the present invention is to provide a new and improved electrical cable terminal of the character described employing an insulating dielectric fluid, a trust bearing insulation, an elastomeric insulation, and compressive force, in a manner ensuring that air within the dielectric portion of the terminal is eliminated.

The foregoing and other objects and advantages of the present invention are accomplished in one illustrated embodiment thereof comprising a terminal apparatus for high voltage power cable having a rigid housing with an elongated axial bore for receiving a terminal end portion of the cable. An annular, elastomeric sealing filler is provided on the end portion of the cable forming a fluid-tight seal at one end of the housing between the cable and the bore wall surface. The elastomeric sealing filler is extended into the bore of the housing for a distance substantially less than the length of insulation required for the specific voltage being used, and one or more load bearing insulating members and a dielectric insulating fluid are provided in the remaining length of the housing bore to furnish the needed length of insulation. Thrust means is provided for maintaining the elastomeric filler means in air-free sealing engagement between the cable and the housing bore.

For a better understanding of the present invention, reference should be had to the following detailed description and claims taken in conjunction with the drawing, in which:

FIG. 1 is a sectional/elevational view of a new and improved high voltage cable terminating apparatus characterized by the features of the present invention with the sectional portion of the view taken along a plane containing the longitudinal center axis of the terminated cable; and FIG. 2 is a fragmentary sectional elevational view of the upper end portion of another embodiment of a cable terminating apparatus constructed in accordance with the features of the present invention with the sectional portion of the view being taken along a longitudinal plane containing the central longitudinal axis of the terminated cable.

Referring now more particularly to the drawings and especially the embodiment shown in FIG. 1, therein is illustrated a new and improved cable terminating apparatus 10 constructed in accordance with the present invention and especially adapted for use in terminating high voltage, power cables such as the cable 12. The cable 12 includes a central conductor 14 having a plurality of spirally wound, individual wires 16 and a conductor shield (not shown) is formed around the bundle of wires making up the central conductor. The conductor shield is surrounded by the cable insulation 18 which is covered by a conductive outer shield 20 which is commonly maintained at a ground potential so that the dielectric stress gradient in the insulation 18 between the shield 20 and the conductor shield is relatively uniform throughout the length of the cable.

The terminal apparatus 10 is relatively long (for example, in a 138 kilovolt application the overall length of the illustrated apparatus approaches 8 feet) and includes an elongated, hollow terminal housing having a body 22 constructed of rigid material, such as wet process porcelain with a glazed surface. The terminal body includes a generally cylindrical, uniform diameter, axial bore 24 extending longitudinally thereof between an upper end portion 26 and a lower end portion 28. The outer surface of the housing body between the upper and lower end portions 26 and 28 is provided with a plurality of integral radially outwardly extending, longitudinally spaced annular rings or ridges 30.

An upper terminal assembly 32 and a lower terminal assembly 34 are mounted adjacent the upper and lower ends, respectively, on the housing body and the upper terminal includes a terminal ring 36 which is fixedly mounted on the upper end portion 26. The terminal ring 36 includes a generally cylindrical sidewall 38 and a radially, inwardly extending, upper end flange 40 having a central opening 40a approximately equal in diameter to the cylindrical bore 24.

In order to permanently secure the terminal ring 36 onto the upper end portion 26 of the body 22, the inside surface of the skirt or sidewall 38 is formed with a plurality of alternate ridges and grooves 38a and the facing opposite surface of the housing end portion 26 is provided with a plurality of alternate ridges and grooves 26a. The space between the facing sets of ridges and grooves 26a and 38a is filled with a strong, weather-proof, electrically conducting cementitious material 42, such as a conductive epoxy resin. When the material 42 cures, the terminal ring 36 is permanently affixed on the body 22 and an airtight seal between the upper end face of the body and the end flange 40 of the terminal ring 36 is obtained with an O-ring 44 seated in an annular groove on the underside of the flange portion.

The lower terminal assembly 34 includes an upper ring member 46 permanently mounted on the lower end portion 28 of the body 22 and the ring member includes an upwardly extending cylindrical skirt or sidewall 48 and an integral, radially inwardly extending, lower end wall or flange 50 having a central aperture 50a substantially equal in diameter to the diameter of the cylindrical bore 24. The outer surface of the lower end portion 28 of the body is formed with a plurality of alternate ridges and grooves 28a, and the oppositely facing, confronting inner surface of the terminal ring skirt 48 is formed with a plurality of grooves and ridges 48a. The space between the facing sets of grooves and ridges is filled with a strong cementitious material 52 like the material 42, and the ring 46 is permanently affixed to the lower end of the body 22 when the material 52 cures.

The terminal assembly 34 includes a removable, lower terminal member 54 having a cuplike portion 56 forming a lower end portion of the housing and substantially equal in diameter to the cylindrical bore 24 in the body 22. The member 54 includes a radially outwardly extending flange 58 at the upper end adapted to seat against the lower end face of the terminal ring 46 and the members 46 and 54 are connected together by a plurality of cap screws 60. A radially inwardly extending flange 62 is formed at the lower end of the cup portion 56 and the end flange defines a central opening larger in diameter than the outer diameter of the cable shield 20. A washer 64 formed of strong material, such as phenolic resin or the like and having a central aperture approximately equal in diameter to the outer diameter of the cable shield 20 being used, is supported by the end flange 62.

In accordance with the present invention, the cup portion 56 is adapted to contact and enclose at least a lower end portion of a hollow, tubular elastomeric sealing filler 66. The elastomeric filler member is formed with an axial bore therethrough having a diameter approximately equal to the outer diameter of the cable insulation 18, so that the filler can fit onto the terminal end portion of the cable insulation after the shield 20 has been stripped back from the end of the cable for a predetermined distance. The filler 66 includes a lower segment 68 formed of conducting elastomeric material and an upper segment 70 formed of dielectric elastomeric material, both materials preferably having approximately the same durometer hardness rating. The upper end surface of the conducting portion 68 and the lower end surface of the dielectric portion 70 are of matching frustoconical shape and are in direct contact together to provide a frustoconical interface area "A" which tapers upwardly and outwardly from the insulation 18 of the cable. When the cable 12 is prepared for termination and before the terminal end portion is inserted into the terminal apparatus 10, the shield 20 is stripped back from the cable end a predetermined distance and is chamfered so that the shield will slide into the bore of the filler 66 and make electrical contact with the lower conducting segment 68. Electrical contact is thus established between ring 46 and removable member 54 of the lower terminal assembly 34 and the cable shield 20 through the lower, conducting portion 68 of the elastomeric sealing filler 66.

In addition to stripping back the shield 20 from the end of the cable, a portion of the insulation 18, which is generally formed of plastic material such as molded polyethylene is stripped back a predetermined shorter length, leaving exposed a short length of the central conductor 14 at the upper end. A compression fitting 72 having a socket in its lower end is slipped onto the exposed portion of the conductor 14 and is crimped or compressed with a tool to secure the fitting permanently in place on the cable. The upper end portion of the fitting or terminal pin 72 is provided with threads as shown, and the fitting extends upwardly through a central opening in the top wall 76 of a removable, upper terminal cap member 74 which is secured to the terminal ring 36 with a plurality of cap screws 78. The cap member 74 includes a generally cylindrical skirt or sidewall 80 having a lower end surface adapted to seat in an annular recess 36a formed around the outer periphery of the terminal ring 36. An O-ring 82 is provided to form an airtight seal between the cap member and the terminal ring 36, and an O-ring 84 is mounted on the terminal fitting 72 to seal between the body of the fitting and the confronting surface of the circular aperture in the top wall 76. A nut 86 is used on the upper threaded portion of the terminal fitting 72 to aid in supporting the cable in a fully inserted position in the apparatus.

In order to provide an air-free dielectric system around the cable insulation 18 above the filler 66, the upper portion of the interior bore 24 of the housing 22 around the cable insulation 18 is filled with an insulating fluid, such as silicone fluid, and with one or more tubular, load bearing insulating sections or rings 90. Alternately, the load bearing insulation may include a plurality of load bearing insulating rods, slats, or sections. The insulator rings 90 are adapted to transmit end thrust toward the upper end face of the filler 66 to squeeze, form, and maintain the filler in fluid-tight, air-free, slideable interfacial contact with adjoining walls of the housing 22, the cuplike portion 56, and the insulation 18. The rings 90 are constructed of insulating material capable of transmitting axial compressive thrust against the radial upper end face of the upper dielectric segment 70 and the lower end portion of each ring is conically tapered toward a point as shown in the drawings in order to prevent entrappment of air bubbles between abutting ends of the rings. One of the conical lower end surfaces is provided with one or more slots, passages, or ports 90a in order for the dielectric fluid to flow between the interior and exterior surfaces of the rings and to pass air bubbles toward the other end of the housing. This construction also permits the pooling of a supply to fluid at the junctions between adjacent insulator rings 90, which fluid can then more easily flow to fill the voids as the air escapes. The lowest insulator ring adjacent the filler 66 bears against a load bearing washer 92 which acts to spread the thrust over a larger area on the upper end face of the filler. Because of the relatively loose fit of the insulating rings 90 within the bore 24, the dielectric fluid flows easily downwardly into the lower end portion of the housing and displaces the air which, being lighter in weight, passes upwardly and out the upper end of the bore.

Because the elastomeric filler 66 is relatively short in length in comparison to the total length of dielectric material desired for a given high voltage application, the volume or space above the filler within the housing bore around the cable insulation 18 can become relatively large, especially in the higher voltage ranges. If this space is filled entirely with dielectric fluid, because of the relatively high temperature coefficient of expansion of presently available fluids, the depth of level of fluid above the filler may vary over too large a range when extremes in temperatures are encountered For example, in below zero weather the volume occupied by a given mass of fluid is reduced significantly and the fluid depth above the filler 66 may be reduced below an acceptable level. The use of load bearing insulating rings 90 has eliminated this problem and in addition provides a convenient means for transmitting end thrusts against the filler 66 to maintain the filler in air-free sealing engagement throughout a wide variation in temperature. In one embodiment constructed in accordance with the invention, the insulation rings 90 were made from hollow tubing formed of phenolic resin, a material having high mechanical strength, excellent dielectric characteristics and a relatively low coefficient of thermal expansion.

In higher voltage applications wherein greater lengths are required, several insulating rings 90 are used rather than a single longer unit. The use of several shorter length rings overcomes mechanical problems encountered because of dimensional tolerances in the housing bore, irregular or curved bore axes or cable misalignment in the bore. The internal diameter of the rings 90 is made larger than the diameter of the cable insulation 18, and allows for the maximum diameter of cable insulation that can be expected under working manufacturing dimensional tolerances permitted. The outer diameter of the rings is made smaller than the smallest bore diameter that can be expected under working manufacturing tolerances so that the rings can accommodate maximum variations in cable insulation and housing bore diameter as well as bends and axial misalignment between the cable and bore.

In order to supply downward end thrust for sealing the elastic filler 66 in the lower end of the housing bore, an annular thrust ring 94 is mounted inside the cap member 74 supported on a plurality of radially spaced apart compression springs 96 extending longitudinally parallel and outwardly of the cable. The lower ends of the compression springs 96 bear against the upper end face of the upper insulating ring 90 and the upper end of the springs are in contact with the lower surface of the thrust ring. Each spring is guided against lateral deflection by a coaxially centered guide rod 98 having a threaded lower end portion extended into a threaded aperture formed in the upper insulator ring 90. In addition to preventing lateral displacement of the spring 96, each guide rod is formed with an annular groove 98a spaced downwardly from the upper end a predetermined distance to indicate visually to an observer when the desired amount of spring compression is obtained to insure an adequate seal or compression of the filler 66. As shown in FIG. 1, when grooves 98a on the rods 98 are visible just above the upper surface of the thrust ring 94 the amount of compression on the springs is proper.

The thrust ring 94 is movable downwardly relative to the housing 22 in order to compress the springs 96 by a plurality of threaded rods 100 and nuts 102. The lower end of each rod is connected to the upper end wall or flange 40 of the terminal ring 36, preferably by threaded engagement as illustrated and as the nuts 102 are tightened on the rods, the thrust ring 94 is drawn downwardly to exert end thrust against the filler 66 through the springs 96, the insulator rings 90, and washer 92. FIG. 1 illustrates the springs 96 in a compressed condition after the cable termination has been completed.

In using the terminal apparatus 10, a terminal end portion of the cable 12 is straightened, trained into place and cut off a predetermined distance above a mounting surface for supporting the terminal apparatus. The cable is prepared by first stripping back a length of the outer cable shield and a predetermined stripping length of the cable insulation 18. The inner conductor shield is removed to expose the central conductor 14 and the terminal pin 72 is crimped onto the exposed end of the central conductor. The upper end of the insulation 18 is chamfered as shown and the outer shield 20 is trimmed off and chamfered a predetermined distance from the end of the cable. A light film of dielectric fluid is spread over the prepared end portion of the cable and a short portion of the outer shield 20, and the terminal apparatus 10 is lowered into place on the upstanding prepared end portion of the cable until the lower surface of the flange 58 rests on a prepared mounting structure (not shown). As the terminal apparatus is lowered onto the cable which extends upwardly through the bore of the filler 66 and the rigid insulator rings 90, air is expelled upwardly, and when the apparatus is in place the outer shield 20 of the cable is in electrical contact with the lower conducting segment 68 of the elastomeric filler. The nuts 102 are tightened to seal the filler in the lower end of the housing and the proper compression on the springs 96 is indicated when the grooves 98a appear just above the thrust ring 94. Dielectric fluid is then poured into the housing above the filler 66 and, after large air bubbles have stopped, fluid is poured until the upper level approaches the upper level of the terminal ring 36. The frustoconical interface "A" between the conducting segment 68 and dielectric segment 70 of the filler 66 establishes the initial symmetry of the pattern of dielectric stress and because the sealing action of the elastomeric filler 66 extends only along a relatively short or fractional portion of the total dielectric length, extremely close dimensional tolerances on the elastomeric filler 66 and the housing components are not required even though extremely high voltages are involved. The springs 96 acting through the insulator rings 90 maintain the filler 66 in air-free sealing engagement around the cable at the lower end of the housing and even though the apparatus is subjected to extreme temperature variations after installation, the seal is maintained and excellent air-free dielectric characteristics for the terminal are established and maintained.

Referring now to FIG. 2, therein is illustrated another embodiment of a cable terminating apparatus in accordance with the invention and referred to by the reference numeral 10A. The apparatus 10A differs from the apparatus 10 previously described only in that a single relatively large compression spring 96A is utilized to transmit thrust or compressive force between the thrust ring 94 and the upper end face of the upper rigid insulator ring 90 rather than a plurality of separate springs 96 as in the first embodiment. The single compression spring 96A helps in guiding the terminal assembly into proper coaxial alignment on the cable as the housing is lowered in place.

While there have been illustrated and described two embodiments of the present invention, it will be apparent that many variations may be made therein, all within the scope and spirit of the invention.

What is claimed as new and desired to be secured by Letters Patent of the U.S. is:

1. A device for terminating a high voltage cable comprising
an elongated housing receiving an end portion of said cable,
dielectric means extending longitudinally within said housing between the outer surface of said end portion and the inner surface of said housing, said dielectric means including both a liquid dielectric means and a solid dielectric means,
sealing means positioned around said end portion of said cable at a first end of said housing, and
compressive means at a second end of said housing axially loading said sealing means into an air-free sealing engagement with both said end portion of said cable and said housing,
said solid dielectric means positioned to transfer the compressive force from said compressive means to said sealing means.

2. A device as recited in claim 1 wherein said compressive means is adjustable to provide a variable axial load on said sealing means.

3. A device as set forth in claim 2 further comprising means for indicating the existence of a predetermined axial load on said sealing means.

4. A device as recited in claim 1 wherein said solid dielectric means comprises at least one elongated, annular dielectric member positioned between said compressive means and said sealing means.

5. A device as set forth in claim 1 wherein said solid dielectric means comprises a plurality of elongated, annular dielectric members longitudinally positioned in an end-to-end relation between said compressive means and said sealing means.

6. A device as recited in claim 1 wherein said sealing means comprises an annular deformable sealing means.

7. A terminal apparatus for an insulated power cable comprising an elongated housing receiving a terminal end portion of said cable, deformable sealing means closing one end of said housing around said cable in an air-free seal, a conducting terminal adjacent an opposite end of said housing connected to said power cable, thrust means exerting an end thrust on said sealing means and maintaining the same in an air-free sealing engagement between said housing and said cable, thrust bearing dielectric means in said housing between said terminal and said sealing means, and a dielectric liquid in said housing between said sealing means and said terminal, said sealing means including a tubular elastomeric filler mounted on said cable, said filler being substantially shorter in axial length than the distance between said filler and said terminal, said thrust bearing dielectric means including a plurality of annular rings mounted on said cable in an end-to-end relation for transmitting compressive force against an end face of said filler, at least one of said rings having a conically tapered end surface adjacent the end of an adjacent ring and passage means for permitting the flow of said liquid between the inside and the outside of said rings.

8. A terminal apparatus for a power cable of the type including a central conductor and surrounding insulation, said apparatus comprising a housing having an elongated bore receiving an end portion of said cable, an elastomeric sealing means projecting into said bore for a distance substantially less than the length of said bore, dielectric liquid in said bore above said sealing means, thrust bearing insulator means maintaining said sealing means in a sealing engagement between said bore and said cable, and thrust means comprising a ring member supported from said housing and at least one compression spring disposed between said ring member and an end face of said insulator means.

9. The terminal apparatus of claim 8 wherein said ring member extends around said cable and said spring is in coaxial alignment around said cable.

10. A terminal apparatus for an insulated power cable comprising an elongated housing assembly receiving a terminal end portion of said cable, annular deformable sealing means within said housing assembly around said cable, thrust means including a plurality of annular insulating rings mounted on said cable in an end-to-end relation for transmitting a compressive force to said sealing means and thereby maintaining said sealing means in a sealing engagement between said housing assembly and said cable, at least one of said rings having a conically tapered end surface adjacent the end of an adjacent ring and passage means in one of said rings for permitting the flow of a dielectric liquid between the inside and the outside of said rings, and a dielectric liquid within said housing assembly above said sealing means.

* * * * *